(12) United States Patent
Oyekanlu et al.

(10) Patent No.: US 11,878,422 B2
(45) Date of Patent: Jan. 23, 2024

(54) INTEGRATED MANUFACTURING AUTOMATION SYSTEM ARCHITECTURE

(71) Applicant: CORNING RESEARCH & DEVELOPMENT CORPORATION, Corning, NY (US)

(72) Inventors: Emmanuel Adebomi Oyekanlu, Big Flats, NY (US); Windsor Pipes Thomas, III, Wilmington, NC (US)

(73) Assignee: Corning Research & Development Corporation, Corning, NY (US)

( * ) Notice: Subject to any disclaimer, the term of this patent is extended or adjusted under 35 U.S.C. 154(b) by 167 days.

(21) Appl. No.: 17/326,960

(22) Filed: May 21, 2021

(65) Prior Publication Data

US 2022/0371192 A1 Nov. 24, 2022

(51) Int. Cl.
*B25J 9/16* (2006.01)
*B25J 13/00* (2006.01)
*B25J 9/00* (2006.01)

(52) U.S. Cl.
CPC ........... *B25J 9/1661* (2013.01); *B25J 9/0084* (2013.01); *B25J 9/161* (2013.01); *B25J 13/006* (2013.01)

(58) Field of Classification Search
CPC ........ B25J 9/1661; B25J 9/0084; B25J 9/161; B25J 13/006; B25J 5/007;

(Continued)

(56) References Cited

U.S. PATENT DOCUMENTS 7,823,126 B2 10/2010 Kim et al.
2019/0064845 A1 2/2019 Pardasani et al.
(Continued)

FOREIGN PATENT DOCUMENTS

WO 2020/243823 A2 12/2020

OTHER PUBLICATIONS

"Telit FN980 and FN980m Modules are the First Certified for Use on Verizon's 5G Ultra Wideband and Nationwide Networks", Available at: https://www.verizon.com/about/news/verizon-business-private-mec-aws, Jan. 20, 2021, pp. 2.

(Continued)

*Primary Examiner* — Adam R Mott
*Assistant Examiner* — Matthew C Gammon
(74) *Attorney, Agent, or Firm* — Adam R. Weeks

(57) ABSTRACT

An automation server accesses a task for a robotic device. The automation server generates motor control commands for the robotic device to complete the task. The automation server transmits, via a network and in a format defined by an Application Program Interface (API), the motor control commands from the automation server to a fleet manager associated with the robotic device, the motor control commands for forwarding from the fleet manager to the robotic device. The automation server receives, from one or more sensors attached to the robotic device and via the network, robotic device sensor data. The automation server receives, from multiple remote sensors and via the network, remote sensor data. The automation server adjusts the generated motor control commands to complete the task based on the robotic device sensor data and the remote sensor data.

14 Claims, 7 Drawing Sheets

(58) Field of Classification Search
CPC .... G05B 19/41895; G05B 2219/32015; G05B 2219/32277; G05B 2219/32388; G05B 2219/50393; G05B 19/418; G05B 19/41865; G05D 1/0291
See application file for complete search history.

(56) References Cited

U.S. PATENT DOCUMENTS

| | | | | |
|---|---|---|---|---|
| 2020/0001471 | A1 | 1/2020 | Chen et al. | |
| 2020/0150687 | A1* | 5/2020 | Halder | G05D 1/0291 |
| 2020/0192337 | A1* | 6/2020 | Hoffman | G05B 19/41805 |
| 2022/0035727 | A1* | 2/2022 | Scott, II | G06F 11/3438 |
| 2022/0269284 | A1* | 8/2022 | Chen | B60W 60/001 |

OTHER PUBLICATIONS

"5G for Connected Industries and Automation", In 5G Alliance for Connected Industries and Automation, Available at: https://www.5g-acia.org/fileadmin/5GACIA/Publikationen/Whitepaper_5G_for_Connected_Industries_and_Automation/WP_5G_for_Connected_Industries_and_Automation_Download_19.03.19.pdf, Feb. 2019, pp. 28.

"How are Fleet Management Systems implemented in different robotic companies?", In Robosera TiAMR, Available at: https://medium.com/@robosera.info, Aug. 14, 2020, pp. 11.

"What's in the Future of 5G", In Qualcomm presentation, Available at: https://www.qualcomm.com/media/documents/files/future-of-5g.pdf, Oct. 2019, pp. 35.

AGV Network, "AGV in Hospitals. Autonomous Mobile Robots Disrupting Healthcare Automation" Interface For Communication Between Driverless Transport Vehicles (AGV) and a Controller by the trade group Verband der Automobile, Available at: https://www.agvnetwork.com/Automation-Hospitals-AGV-Autonomous-Mobile-Robots, VDA 5050—Version 1.1, Jun. 2020, pp. 23.

Ashraf, "Verizon Business brings private MEC to enterprise customers with AWS", Available at: https://www.verizon.com/about/news/verizon-business-private-mec-aws, May 2021, pp. 4.

Emmanuel et al., "A Review of Recent Advances in Automated Guided Vehicle Technologies: Integration Challenges and Research Areas for 5G-Based Smart Manufacturing Applications" in IEEE Access Oct. 2020, pp. 42.

Hill, "Ericsson puts 5G to work in its Texas factory", Available at: https://www.rcrwireless.com/20210413/wireless/ericsson-puts-5g-to-work-in-its-texas-factory#prettyPhoto, Apr. 13, 2021, pp. 4.

Jeffcock, "What's the Difference Between AI, Machine Learning, and Deep Learning?", In Oracle website white paper, Available at: https://blogs.oracle.com/bigdata/difference-ai-machine-learning-deep-learning#:~:text=Machine%20learning%20is%20a%20subset,to%20solve%20more%20complex%20problems, Jul. 2018, pp. 6.

Small, "Software vs. Hardware Encoders for Live Streaming: Your Options Explained [2021 Update]", Available at: https://www.dacast.com/blog/software-vs-hardware-encoders-for-live-video-streams/, May 27, 2021, pp. 50.

Trebilcock, "Logistics Management", Available at: https://www.logisticsmgmt.com/article/robotic_software_takes_control_of_the_warehouse, Jun. 8, 2020, pp. 3.

* cited by examiner

US 11,878,422 B2

INTEGRATED MANUFACTURING AUTOMATION SYSTEM ARCHITECTURE

TECHNICAL FIELD

Embodiments pertain to system architecture. Some embodiments relate to an integrated manufacturing automation system architecture.

BACKGROUND

A factory or other facility may use robotic devices from multiple different vendors. Each robotic device vendor provides its own fleet manager for communication with and control of its robotic devices. The software and/or the hardware in different vendors' fleet managers and robotic devices may be incompatible with one another. Techniques for integrating robotic devices and fleet managers from different vendors may be desirable.

SUMMARY

Figure 1:
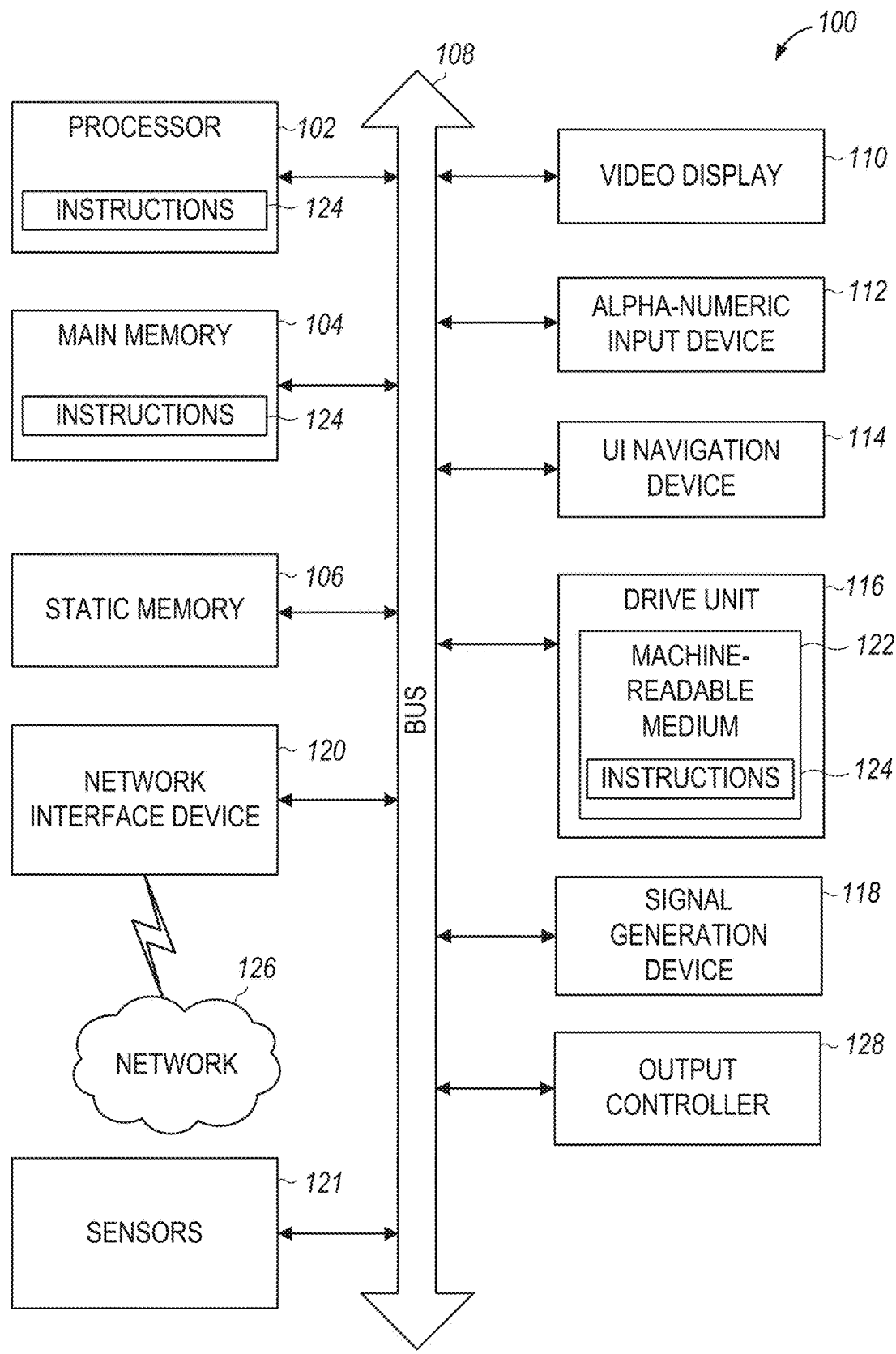
FIG. 1 is a block diagram of a computing machine, in accordance with some embodiments.

Some embodiments relate to a method comprising: accessing, at an automation server, a task for a robotic device; generating, at the automation server, motor control commands for the robotic device to complete the task; transmitting, via a network and in a format defined by an Application Program Interface (API), the motor control commands from the automation server to a fleet manager associated with the robotic device, the motor control commands for forwarding from the fleet manager to the robotic device; receiving, at the automation server and from one or more sensors attached to the robotic device and via the network, robotic device sensor data; receiving, at the automation server, from multiple remote sensors, and via the network, remote sensor data; adjusting, at the automation server, the generated motor control commands to complete the task based on the robotic device sensor data and the remote sensor data.

Some embodiments relate to a non-transitory computer-readable medium storing a set of instructions includes one or more instructions that, when executed by one or more processors of an automation server, cause the automation server to: access, at the automation server, a task for a robotic device; generate, at the automation server, motor control commands for the robotic device to complete the task; transmit, via a network and in a format defined by an Application Program Interface (API), the motor control commands from the automation server to a fleet manager associated with the robotic device, the motor control commands for forwarding from the fleet manager to the robotic device; receive, at the automation server and from one or more sensors attached to the robotic device and via the network, robotic device sensor data; receive, at the automation server, from multiple remote sensors, and via the network, remote sensor data; adjust, at the automation server, the generated motor control commands to complete the task based on the robotic device sensor data and the remote sensor data.

Some embodiments relate to an automation server including processing circuitry; and a memory storing instructions which, when executed by the processing circuitry, cause the processing circuitry to: access, at the automation server, a task for a robotic device; generate, at the automation server, motor control commands for the robotic device to complete the task; transmit, via a network and in a format defined by an Application Program Interface (API), the motor control commands from the automation server to a fleet manager associated with the robotic device, the motor control commands for forwarding from the fleet manager to the robotic device; receive, at the automation server and from one or more sensors attached to the robotic device and via the network, robotic device sensor data; receive, at the automation server, from multiple remote sensors, and via the network, remote sensor data; adjust, at the automation server, the generated motor control commands to complete the task based on the robotic device sensor data and the remote sensor data.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, a factory or other facility may use robotic devices, for example, autonomous mobile robots (AMRs) or automated guided vehicles (AGVs), from multiple different vendors. Throughout this document "AMR" and "AGV" may be used interchangeably. Each AMR vendor provides its own fleet manager for communication with and control of its AMRs. The software and/or the hardware in different vendors' fleet managers and AMRs may be incompatible with one another. Techniques for integrating AMRs and fleet managers from different vendors may be desirable. As used herein, the phrase "robotic device" may include any device that includes processing circuitry and memory and capable of performing routine manual tasks, such as an AMR, an AGV, a robot arm with programmable logic controllers (PLC), or any other PLC-operated device such as manufacturing process equipment, facilities, and the like.

In accordance with some embodiments, each fleet manager is reduced to directing a motion controller for its AMRs, and an automation server communicates with the fleet managers. The automation server also receives (e.g., over a network which may be, for example, a communications network such as a fifth generation ("5G") communications network), from sensor(s) attached to the AMRs, sensor data (e.g., video data, motion sensor data, temperature data, and the like). The terms "sensor" and "sensor device" are used interchangeably in this document. The sensors may be manually attached to the AMRs by the factory (rather than by the vendor) and may be programmed to communicate directly with the automation server, bypassing the fleet manager.

In some embodiments, an automation server accesses, from a wareflow management server, a task to be completed by an AMR. The automation server, having visibility to all AMRs in the factory regardless of capability and vendor, selects the most efficient AMR to complete the task based on user-defined criteria such as capability, location, battery life, etc. The automation server generates motor control commands for the most efficient AMR in the factory based on the task. The automation server transmits, to a fleet manager associated with the AMR and via a network (e.g., a 5G network), the motor control commands for forwarding from the fleet manager to the AMR. The automation server receives, from a sensor attached to the AMR and via the network, AMR sensor data. The automation server receives, from multiple remote sensors and via the network, remote sensor data. The automation server adjusts the generated motor control commands based on the AMR sensor data and the remote sensor data. The adjusted motor control commands may be provided to the fleet manager associated with the AMR, as detailed above.

Some embodiments relate to integration of manufacturing factory automation control of mobile robots, PLCs, and remote sensors from many vendors into a single, onsite centralized automation server leveraging bandwidth, security, latency, and quality of service of a private 5G network (or other network).

It may be desirable for manufacturing automation technology to be integrated across a factory/plant to capture maximum benefit—from autonomous robots to PLC-operated devices to sensors. In some cases, it is not so integrated, as vendors have proprietary closed systems. These closed systems not only limit functionality, they bottleneck communication and processing. The industry may benefit from seamless, real-time processing of large amounts of data to leverage not only existing manufacturing execution systems, but also the rapid deployment of artificial intelligence applications, such as deep learning.

Some embodiments relate to a new system architecture that bypasses proprietary vendor-specific interfaces that limit choice and constrain performance. Some embodiments leverage a centralized, high-performance, onsite automation server that communicates directly with each platform, PLC, and sensor via a network-based (e.g., 5G) module. This automation server leverages the power of an onsite high-end single server and the performance of a private network (e.g., a private 5G network) to enable real-time data collection from a wide variety of sources. Some embodiments include the processing power to analyze this data using neural network applications. Some embodiments provide real-time use of the data to make decisions and direct factory automated activity. Some embodiments are implemented using a private network that exists entirely within the four walls of a factory or a plant for increased security.

Aspects of the present technology may be implemented as part of a computer system. The computer system may be one physical machine, or may be distributed among multiple physical machines, such as by role or function, or by process thread in the case of a cloud computing distributed model. In various embodiments, aspects of the technology may be configured to run in virtual machines that in turn are executed on one or more physical machines. It will be understood by persons of skill in the art that features of the technology may be realized by a variety of different suitable machine implementations.

The system includes various engines, each of which is constructed, programmed, configured, or otherwise adapted, to carry out a function or set of functions. The term "engine" as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software, the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As used herein, the term "model" encompasses its plain and ordinary meaning. A model may include, among other things, one or more engines which receive an input and compute an output based on the input. The output may be a classification. For example, an image file may be classified as depicting a cat or not depicting a cat. Alternatively, the image file may be assigned a numeric score indicating a likelihood whether the image file depicts the cat, and image files with a score exceeding a threshold (e.g., 0.9 or 0.95) may be determined to depict the cat.

This document may reference a specific number of things (e.g., "six robotic devices"). Unless explicitly set forth otherwise, the numbers provided are examples only and may be replaced with any positive integer, integer or real number, as would make sense for a given situation. For example, "six robotic devices" may, in alternative embodiments, include any positive integer number of robotic devices. Unless otherwise mentioned, an object referred to in singular form (e.g., "a computer" or "the computer") may include one or multiple objects (e.g., "the computer" may refer to one or multiple computers).

FIG. 1 illustrates a circuit block diagram of a computing machine 100 in accordance with some embodiments. In some embodiments, components of the computing machine 100 may store or be integrated into other components shown in the circuit block diagram of FIG. 1. For example, portions of the computing machine 100 may reside in the processor 102 and may be referred to as "processing circuitry." Processing circuitry may include processing hardware, for example, one or more central processing units (CPUs), one or more graphics processing units (GPUs), and the like. In alternative embodiments, the computing machine 100 may operate as a standalone device or may be connected (e.g., networked) to other computers. In a networked deployment, the computing machine 100 may operate in the capacity of a server, a client, or both in server-client network environments. In an example, the computing machine 100 may act as a peer machine in peer-to-peer (P2P) (or other distributed) network environment. In this document, the phrases P2P, device-to-device (D2D) and sidelink may be used interchangeably. The computing machine 100 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 100 may include a hardware processor 102 (e.g., a central processing unit (CPU), a GPU, a hardware processor core, or any combination thereof), a main memory 104 and a static memory 106, some or all of which may communicate with each other via an interlink (e.g., bus) 108. Although not shown, the main memory 104 may contain any or all of removable storage and non-removable storage, volatile memory or non-volatile memory. The computing machine 100 may further include a video display unit 110 (or other display unit), an alphanumeric input device 112 (e.g., a keyboard), and a user interface (UI) navigation device 114 (e.g., a mouse). In an example, the display unit 110, input device 112 and UI navigation device 114 may be a touch screen display. The computing machine 100 may additionally include a storage device (e.g., drive unit) 116, a signal generation device 118 (e.g., a speaker), a network interface device 120, and one or more sensors 121, such as a global positioning system (GPS) sensor, compass, accelerometer, or other sensor. The computing machine 100 may include an output controller 128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 116 (e.g., a storage device) may include a machine readable medium 122 on which is stored one or more sets of data structures or instructions 124 (e.g., software) embodying or utilized by any one or more of the techniques or functions described herein. The instructions 124 may also reside, completely or at least partially, within the main memory 104, within static memory 106, or within the hardware processor 102 during execution thereof by the computing machine 100. In an example, one or any combination of the hardware processor 102, the main memory 104, the static memory 106, or the storage device 116 may constitute machine readable media.

While the machine readable medium 122 is illustrated as a single medium, the term "machine readable medium" may include a single medium or multiple media (e.g., a centralized or distributed database, and/or associated caches and servers) configured to store the one or more instructions 124.

The term "machine readable medium" may include any medium that is capable of storing, encoding, or carrying instructions for execution by the computing machine 100 and that cause the computing machine 100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 124 may further be transmitted or received over a communications network 126 using a transmission medium via the network interface device 120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), cellular networks (e.g., fifth generation digital cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 120 may include one or more physical jacks (e.g., Ethernet, coaxial, or phone jacks) or one or more antennas to connect to the communications network 126.

In some embodiments, the components of FIG. 1 may be coupled with an engine, a transmission, one or more moving arms, and the like, to provide mobility, for example, in an AMR.

Some embodiments relate to an integrated manufacturing automation system architecture, which may leverage a network, such as a private 5G network. The integrated manufacturing automation system architecture may be used on a factory floor with AMRs.

Figure 2:
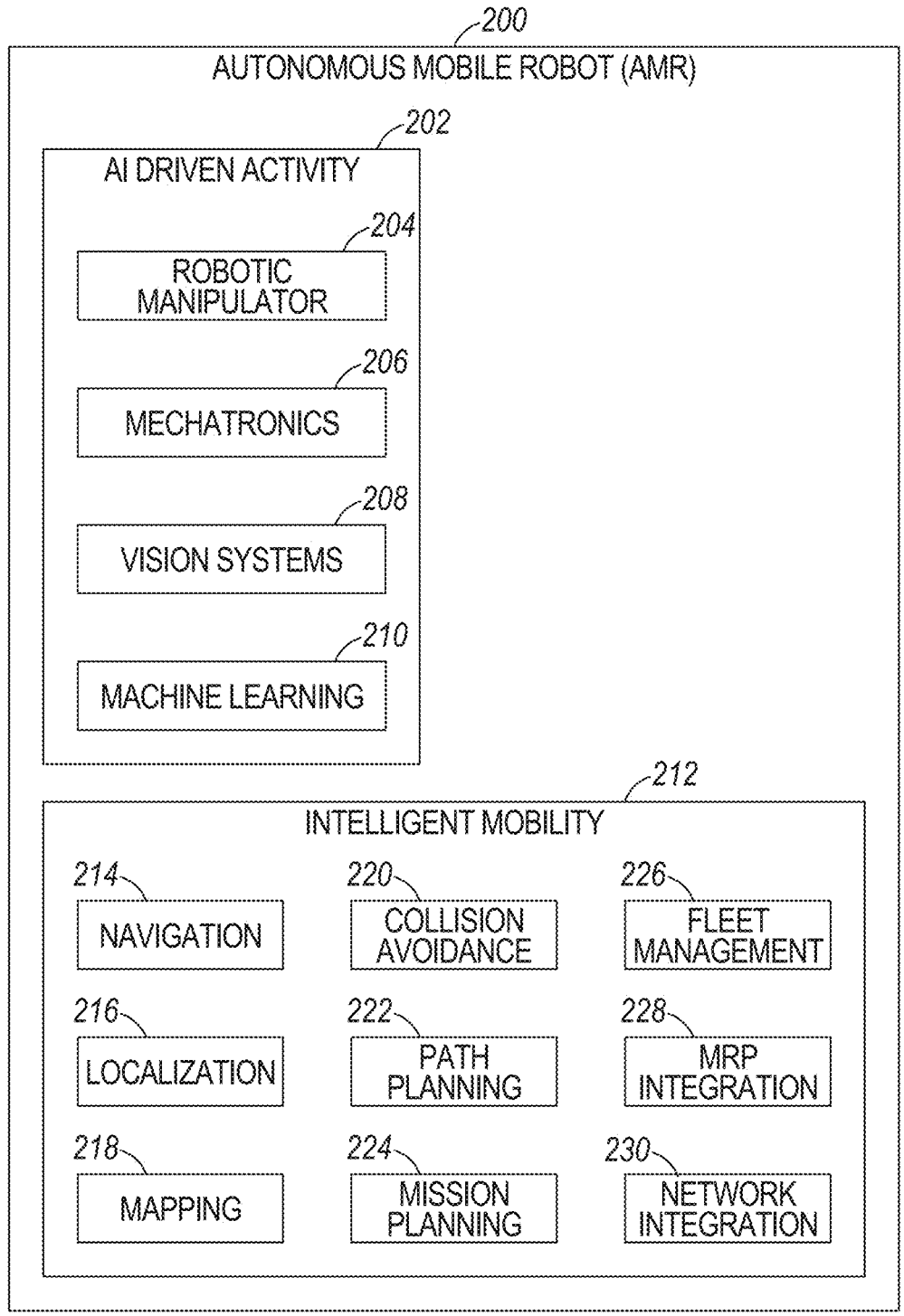
FIG. 2 is a block diagram of an autonomous mobile robot (AMR), in accordance with some embodiments.

FIG. 2 is a block diagram of an AMR 200, in accordance with some embodiments. In this document, and as shown, the AMR is capable of artificial intelligence (AI) driven activity 202 and intelligent mobility 212. The activity 202 may be controlled by programmable logic controllers (PLCs). PLCs may communicate via industry standard Open Platform Communications Unified Architecture (OPC-UA). As shown, the AI driven activity 202 may include, for example: robotic manipulator 204, mechatronics 206, vision systems 208, and machine learning 210. The AI driven activity 202 may also include functionality such as: grab it, lift it, position it, and put it down.

Intelligent mobility 212 may include traveling from point A to point B. This can be anything from rails on fixed paths to the mobility system on a free moving rover (e.g., used in space exploration). As shown, intelligent mobility 212 may include, for example: navigation 214, localization 216, mapping 218, collision avoidance 220, path planning 222, mission planning 224, fleet management 226, material requirements planning (MRP) integration 228, and network (e.g., Wi-Fi) integration 230.

The AMR 200 may be controlled using a fleet manager. A fleet manager enables the complete and centralized management of a fleet of AMRs. In some cases, the fleet manager implements a vendor-specific and proprietary (closed) system. Fleet managers from different vendors may be unable (or poorly able) to communicate with one another. Thus, factories or plants that use AMRs and fleet managers from multiple vendors may have difficulty with operations. In some cases, the AMR and the fleet manager are designed such that all data being provided to or received from an AMR goes through the fleet manager.

Furthermore, the operator interface may be proprietary and unique to each vendor. Variable human-machine interface (HMI) hardware platforms may be used. These can differ widely from vendor to vendor.

The AMR may, in some cases, have little onboard hardware variability for mechatronics. AMRs use the same motors, controllers, sensors, onboard logic, in the same controller area network (CAN) bus/EtherCAT bus communications protocols. AMRs may have highly variable capabilities from platform to platform.

In some cases, Wi-Fi is used for communication between AMR(s) and fleet manager(s). Alternatively, 5G may be used. 5G may provide security, latency, bandwidth, and quality of service (QoS) advantages over some Wi-Fi standards (e.g., Wi-Fi 4).

Figure 3:
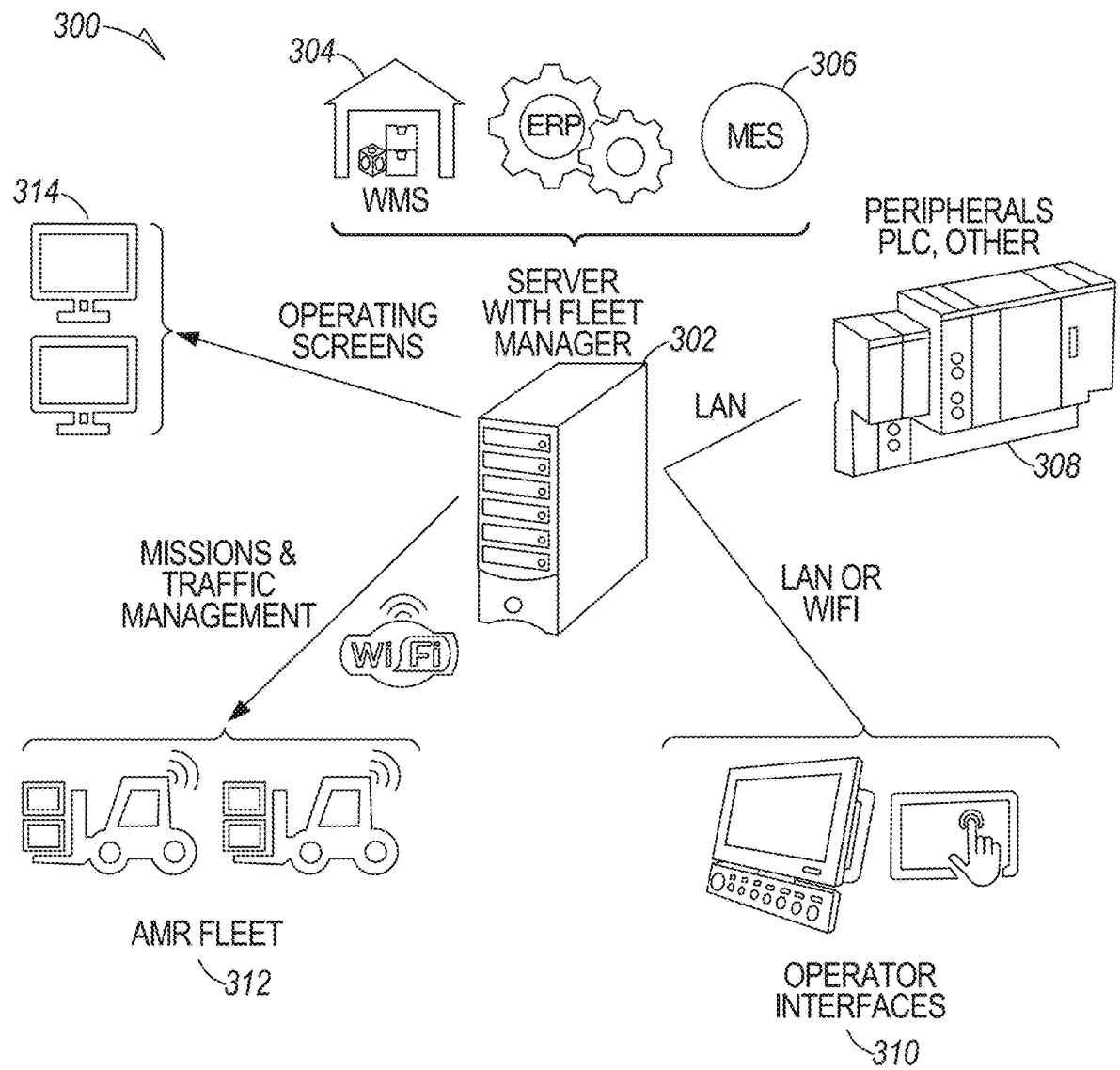
FIG. 3 illustrates a first example AMR system architecture, in accordance with some embodiments.

FIG. 3 illustrates a first example AMR system architecture 300, in accordance with some embodiments. As shown, a server 302 with a fleet manager stored thereon communicates with warehouse management system (WMS) 304, manufacturing execution system (MES) 306, peripheral PLCs 308, operator interfaces 310, AMRs in an AMR fleet 312, and operating screens 314. The communication may be done over Wi-Fi. The fleet manager on the server 302 communicates with AMRs in the AMR fleet 312, which are manufactured by the same manufacturer. Communicating with AMRs manufactured by different manufacturers may require multiple different fleet managers to be stored on the server 302 and to interact with one another.

In some schemes, sensor data are routed from each AMR in the AMR fleet 312 to the fleet manager on the server 302 to a central server over Wi-Fi, if the data leaves the AMR at all. Some sensor readings, such as lidar data, vision data, and encoder data, might never leave the AMR. Even if the data leaves the AMR, it is bottlenecked by proprietary vendor hardware/software over which there might be no control. This data may be tens or hundreds of milliseconds of latency.

In some embodiments, the technology disclosed herein may be implemented at an automation server that is external to the fleet manager and does not include the fleet manager. Thus, the fleet manager and the AMRs do not need to be modified. However, sensor(s) that communicate directly with the automation server, bypassing the fleet manager(s) may be attached to the AMR(s).

Figure 4:
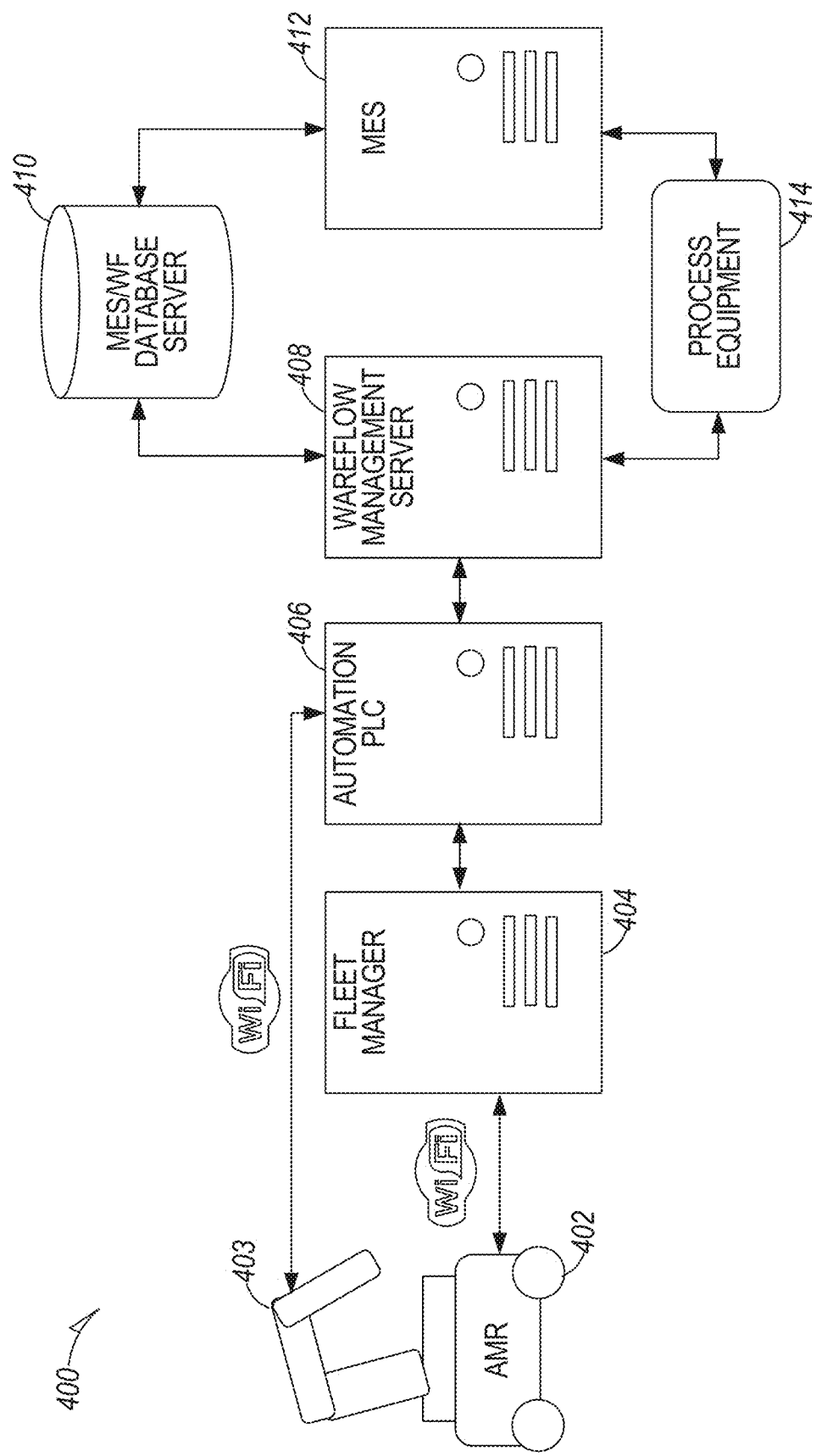
FIG. 4 illustrates a second example AMR system architecture, in accordance with some embodiments.

FIG. 4 illustrates a second example AMR system architecture 400, in accordance with some embodiments. As shown, an AMR 402 communicates with a fleet manager 404. For example, the AMR 402 receives motor control commands from the fleet manager 404. The AMR 402 may have an attached robot arm 403, such as those available from FANUC America Corporation (Rochester Hills, Michigan, USA), that communicates data directly with the automation PLC 406. The automation PLC 406 transmits motor control commands to the fleet manager 404 for forwarding from the fleet manager 404 to the AMR 402. The automation PLC 406 generates the motor control commands based on the received task from a wareflow management server 408 and process equipment 414. The wareflow management server 408 communicates with a manufacturing execution system (MES)/wareflow (WF) database server 410. The MES/WF database server 410 communicates with the MES 412. The MES 412 communicates with the process equipment 414. The process equipment 414 communicates with the wareflow management server 408.

The system architecture 400 allows control of a PLC without having to integrate through the fleet manager 404. However, the system architecture 400 may benefit from further adaptations to allow for a single automation server to communicate with multiple fleet managers and multiple AMRs from different vendors.

Figure 5:
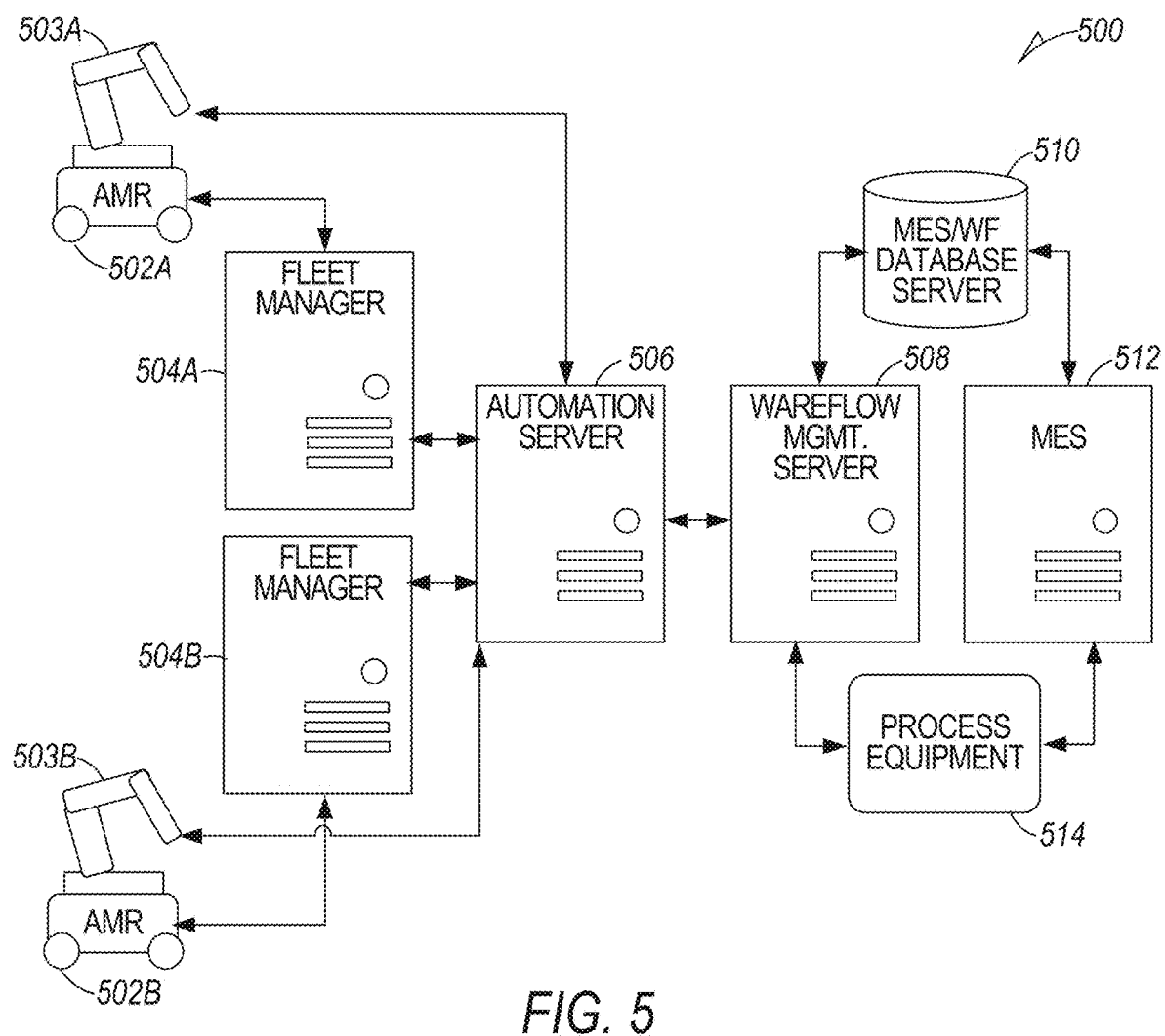
FIG. 5 illustrates a third example AMR system architecture, in accordance with some embodiments.

FIG. 5 illustrates a third example AMR system architecture 500, in accordance with some embodiments. As shown, AMR 502A communicates with (e.g., receives motor control commands from) fleet manager 504A. Similarly, AMR 502B communicates with (e.g., receives motor control commands from) fleet manager 504B. In one example, AMR 502A and fleet manager 504A are associated with manufacturer-A, while AMR 502B and fleet manger 504B are associated with manufacturer-B, where manufacturer-A is different from manufacturer-B. Fleet manager 504A and/or fleet manager 504B may be implemented in software running on a computer (e.g., laptop computer, desktop computer, mobile phone, tablet, server, and the like), where fleet manager 504A and fleet manager 504B may reside on the same computer or on different computers. Alternatively, fleet manager 504A and/or fleet manager 504B may be implemented in hardware or a combination of software and hardware. Fleet manager 504A and fleet manager 504B include a software interface which communicates data to the automation server 506 through one or more Application Programming Interfaces (APIs).

Like the AMR 402 (FIG. 4), the AMRs 502A/502B may each include a robot arm 503A/503B that communicates data directly with the automation server 506.

The above communications between the AMRs 502A/502B and their respective fleet managers 504A/504B, between the fleet managers 504A/504B and the automation server 506, and between the robot arms of the AMRs 502A/502B and the automation server 506 may be transmitted over a network, for example, a Wi-Fi network or a cellular (e.g., 4G or 5G) network. The network may be a wireless network to allow for mobility of the AMRs 502A/502B. However, in some embodiments, a wired network may be used for some of the communications (e.g., the communications between fleet managers 504A/504B and automation server 506).

As shown, the automation server 506 communicates with a wareflow management (mgmt) server 508 (e.g., to develop a movement plan for AMRs 504A/504B). The wareflow management server 508 communicates with the MES/WF database server 510. The MES/WF database server communicates with MES 512. The MES 512 communicates with process equipment 514. The process equipment 514 communicates with the wareflow management server 508. These communications may be processed using the network described above.

It may be desirable to modify the system architecture 500 to allow for high-speed processing of high-resolution images for deep learning and real-time image recognition and characterization. It may be desirable to modify the system architecture 500 to allow it to be expanded with one or more additional sensors and/or PLCs.

TABLE 1

Industrial use cases

| Use case (high level) | | Availability | Cycle time | Typical payload size | # of devices | Typical service area |
|---|---|---|---|---|---|---|
| Motion control | Printing machine | >99.9999% | <2 ms | 20 bytes | >100 | 100 m × 100 m × 30 m |
| | Machine tool | >99.9999% | <0.5 ms | 50 bytes | ~20 | 15 m × 15 m × 3 m |
| | Packaging machine | >99.9999% | <1 ms | 40 bytes | ~50 | 10 m × 5 m × 3 m |
| Mobile robots | Cooperative motion control | >99.9999% | 1 ms | 40-250 bytes | 100 | <1 km$^2$ |
| | Video-operated remote control | >99.9999% | 10-100 ms | 15-150 kbytes | 100 | <1 km$^2$ |
| Mobile control panels with safety functions | Assembly robots or milling machines | >99.9999% | 4-8 ms | 40-250 bytes | 4 | 10 m × 10 m |
| | Mobile cranes | >99.9999% | 12 ms | 40-250 bytes | 2 | 40 m × 60 m |
| | Process automation (process monitoring) | >99.99% | >50 ms | Varies | 10000 | devices per km$^2$ |

Table 1 illustrates various industrial use cases for an AMR system architecture (e.g., AMR system architecture 300, 400 or 500). Some embodiments may leverage a network (e.g., a private 5G network) that is capable of meeting the availability, cycle time, payload size, number of devices, and service area specifications shown in Table 1.

Some embodiments provide security. All data, including live high-resolution video of the environment (e.g., manufacturing floor) may be processed in the cloud (e.g., on a computing device, such as a server hosting a fleet manger 504A/504B or the automation server 506). Some embodiments provide interoperability. AMR vendors provide fleet managers for communicating with their AMRs using proprietary code, in some cases, based on Robot Operating System (ROS) commands, where ROS includes open source specialized code for directing activity of robots. For example, AMR 502A communicates with fleet manager 504A using proprietary code based on ROS commands associated with manufacturer-A. AMR 502B communicates with fleet manager 504B using proprietary code based on ROS commands associated with manufacturer-B, which are different from the proprietary code associated with manufacturer-A.

5G provides powerful performance improvements for industry. This level of performance shown in the use cases of Table 1 can be met using a private 5G network. Some architectures might not be able to cost-effectively achieve these results because, for integrated operations, some AMR communications and some industrial robot PLC communications go through the vendor fleet management systems (FMS). Also, the distributed nature of some physical servers may add latency which increases with complexity of algorithms (e.g., artificial intelligence algorithms).

Some embodiments relate to a proposed architecture that centralizes manufacturing facility automation functionality and computing power to an onsite high-performance automation server (e.g., automation server 506). This automation server is the single interface (or, alternatively, one of multiple interfaces) with factory systems (e.g., wareflow management server 508, MES/WF database server 510, MES 512, and process equipment 514) and communicates with each AMR (e.g., AMRs 502A and 502B), sensor, camera, and/or PLC directly over an onsite 5G (or other) network.

Placing a high-powered automation server inside the walls of a factory or other facility for high-end analytics is useful. Some embodiments are directed to ways to use the automation server. In some examples, the proposed architecture takes advantage of 5G multi-access edge computing (MEC) as a component. Some embodiments leverage the 5G/Edge compute processing power, bandwidth, latency, security, and quality of service to deliver new levels of performance.

Each AMR may have onboard collision avoidance technologies (e.g., software or hardware) for safety reasons. Safety systems on the AMR platform remain intact. These self-contained systems may be network independent to conform to certain standards, for example, those by American National Standards Institute (ANSI) and Robotic Industries Association (RIA). Some embodiments do not alter or interfere with the onboard safety systems of the AMR.

Figure 6:
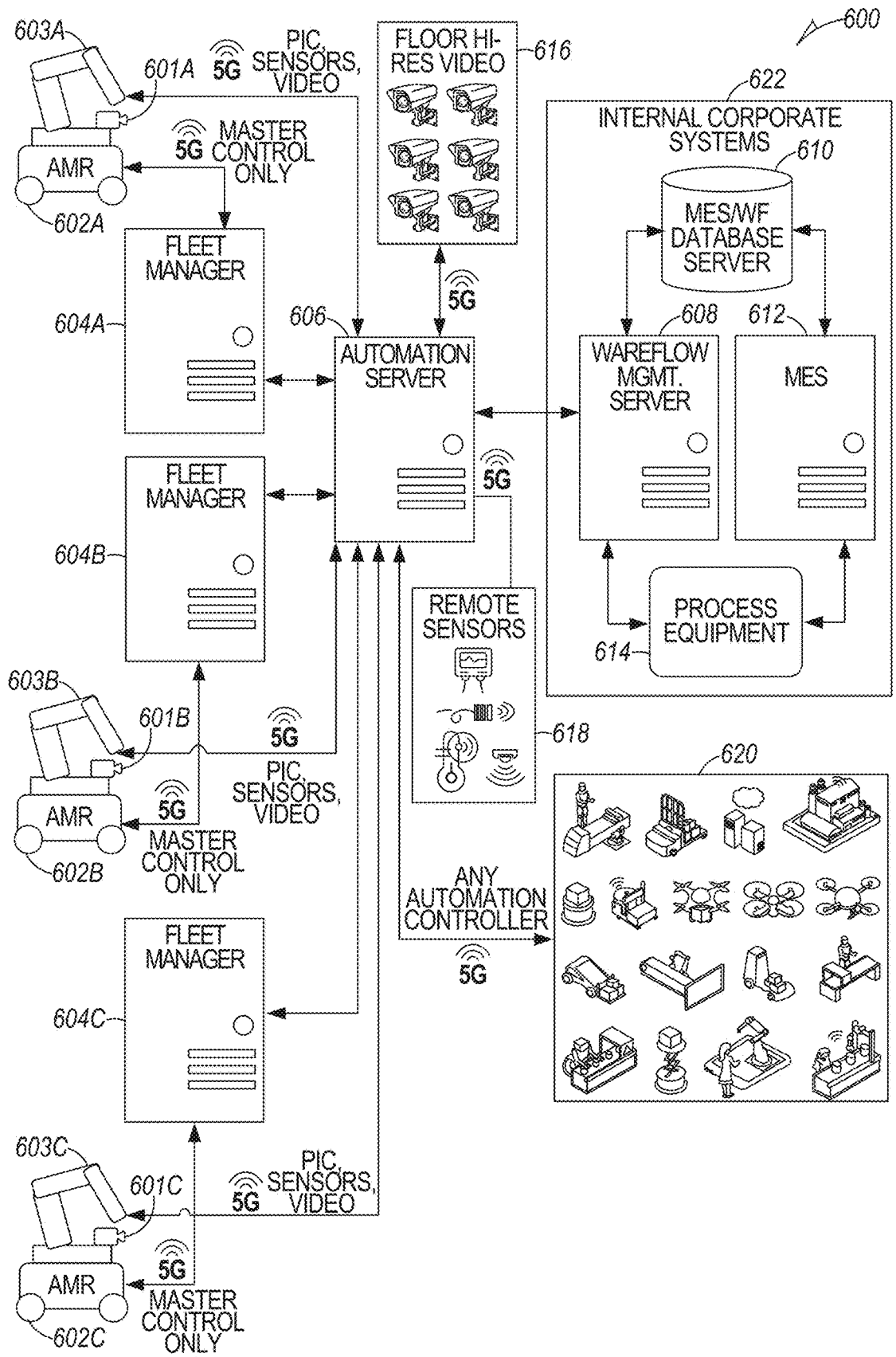
FIG. 6 illustrates a fourth example AMR system architecture, in accordance with some embodiments.

FIG. 6 illustrates a fourth example AMR system architecture 600, in accordance with some embodiments. As shown, there are three AMRs 602A, 602B, and 602C. Each AMR 602A, 602B, 602C communicates with (e.g., receives motor control commands from) a corresponding fleet manager 604A, 604B, 604C over a private 5G (or other) network. It should be noted that the technology disclosed herein may leverage any number of AMRs, not necessarily three AMRs as shown in FIG. 6. Each AMR 602A, 602B, and 602C may include onboard one or multiple sensor devices 601A, 601B, and 601C that each communicate (e.g., via OPC/UA for PLC, RTP/RTSP for video as one example) with an automation server 606 over the private 5G or other network. In some embodiments, PLCs control motors (e.g., equipment, robot arms, doors, and the like) and communicate using open source OPC/UA. For example, like the AMR 402 (FIG. 4), the AMRs 601A, 601B, and 601C may each include a respective robot arm 603A, 603B, and 603C as PLC-operated device that communicate data directly with the automation server 606.

Sensor devices 601A, 601, and 601C may include a temperature sensor that has an integrated 5G or Wi-Fi transmitter. Sensor devices 601A, 601, and 601C may alternatively or additionally include video streams that use protocols such as Real Time Streaming Protocol (RTSP) or Real-time Transport Protocol (RTP) to communicate directly with the automation server 606. The automation server 606, based on the data received from the sensor devices 601A, 601B, and 601C and tasks issued by wareflow management server 608, defines which AMR 602A, 602B, or 602C is best suited to complete the task, and generates, motor control commands. The automation server 606 transmits the motor control commands to the appropriate fleet managers 604A, 604B, or 604C. Each fleet manager 604A, 604B, and 604C forwards, via the private 5G or other network, the motor control commands to its respective AMR 602A, 602B, and 602C. In alternative embodiments, multiple AMRs may be controlled by a single fleet manager. In some embodiments, the fleet managers 604A, 604B, and 604C are used only for motor control of the AMRs 602A, 602B, and 602C.

The automation server 606 may include hardware, for example, as illustrated in FIG. 1. Each fleet manager 604A, 604B, and 604C may be implemented on a computer that includes hardware, for example, as illustrated in FIG. 1. Each AMR 602A, 602B, and 602C may include an onboard computer as illustrated, for example, in FIG. 1. In addition, each AMR 602A, 602B, and 602C may include an engine, transmission, wheels, arm(s), and the like to implement movement and robotic functionalities.

As shown, the automation server 606 communicates with a wareflow management server 608 (e.g., to receive a task for the AMR(s) 602A, 602B, and 602C, based on which the motion control commands are generated). The wareflow management server 608 functions similarly to the wareflow management server 508 of FIG. 5. Similarly, the MES/WF database server 610, MES 612, and process equipment 614 function similarly to the MES/WF database server 510, MES 512, and process equipment 514 of FIG. 5.

As shown, the automation server 606 receives, over the network via a standard format such as RTSP or RTP, video data from fixed manufacturing floor high-resolution video cameras 616. The automation server 606 receives, over the network, remote sensor data from remote sensors 618. The automation server 606 may communicate, over the network, with any automation controller 620 in the factory such as via OPC/UA to its associated PLC.

The automation server 606 may include multiple virtual machines (e.g., VMware® virtual machines). Virtualization software creates a layer over computer hardware that allows the hardware elements of a single computer—processors, memory, storage, and the like, as shown in FIG. 1—to be divided into multiple virtual computers, referred to herein as virtual machines (VMs). Each virtual machine can, but is not required to, run its own operating system (OS) and behaves like an independent computer. Some embodiments include centralizing a manufacturing automation architecture on a single platform as opposed to distribution of average servers (lack of processing capability) in different physical locations (adding latency). Some embodiments leverage the power of combining a fast 5G network with the edge computing resources to deliver a centralized automation server 606.

The automation server 606 may include an automation PLC as one VM, which may be written in standard PLC ladder logic. By writing in standard ladder logic, end user revisions are much easier to adapt and scale. The automation PLC receives inputs from the internal corporate systems 622 (which include wareflow management server 608, MES/WF database server 610, MES 612, and process equipment 614) and sends commands to execute activities. There may be integrators and third party solutions to interface factory systems. However, these may be closed, proprietary, and expensive. It can be difficult for them to be easily used to adjust the manufacturing scope or size without requesting custom code from the vendor. Some embodiments allow for the user to take control of this code in the automation PLC. Some embodiments allow for communication with multiple PLCs in multiple locations and are not tied to just one platform.

The automation server 606 may include a "production area controller (PAC)" manager as another VM. This PAC manager may be written in Python and may convert the outputs of the automation PLC into AMR motion control commands through fleet managers 604A, 604B, and 604C by use of Application Program Interfaces (APIs) customarily provided to their customers to interface with the vendor's fleet managers 604A, 604B, and 604C.

The automation server 606 may include OPC-UA VM to act as both a client and a server for PLC communications with a host of standard PLCs. The OPC-UA VM may communicate directly to PLCs (e.g., sensor devices 601A, 601B, and 601C), not through the fleet managers 604A, 604B, and 604C.

The PAC Manager may also include processing logic to receive data from a variety of device sources, over a network (e.g., a 5G network), and process this data. It will then take actions to support the missions and goals the end user has programmed it to complete. For example, it may receive multiple video streams, process these frames real time, and take actions from monitoring fork truck intersections to informing the MES of the location of "Ware In Process" or "Finished Goods", to issuing commands for an AMR to pick up a box and take to the warehouse.

The automation server 606 may perform some functions previously performed by fleet managers 604A, 604B, and 604C, such as real time site mapping and AMR 602A, 602B, and 602C mission assignments. The fleet manager 604A can only "see" what its own AMR(s) 602A see, the automation server 606 has a more complete map of what is located where and can maintain a broader and more accurate map. Some embodiments allow the automation server 606 to combine additional inputs directly from different sensor devices 601A, 601B, 601C, 616, 618, and 620 and AMRs 602A, 602B, and 602C. The automation server 606 uses its received data to create a centralized complete map to provide guidance (e.g., using Simultaneous Localization and Mapping or SLAM).

Fleet managers 604A, 604B, and 604C in the system architecture 600 are used for the task of basic AMR 602A, 602B, and 602C motion control. The fleet managers 604A, 604B, and 604C might not be used for complete AMR management. In the system architecture 600, a fleet management system (FMS) may be another VM on the automation server 606. There may be one FMS per fleet manager 604A, 604B, and 604C/manufacturer (e.g., A, B, and C) which performs two functions—one is basic motion, and the other is maintenance and storage of specific AMR 602A, 602B, and 602C data such as hours on each unit, onboard software/firmware updates, error logging, diagnostics and troubleshooting. In some embodiments, the system architecture 600 removes the FMS as the central point of the managing fleets of AMR 602A, 602B, and 602C; the FMS is "bypassed" in favor of the automation server 606.

Advantageously, the automation server 606 may control and coordinate AMRs from multiple different manufacturers, such that the factory staff may select the best AMRs from different vendors for different factory needs (e.g., AMR 602A, by manufacturer-A, may be best for heavy loads and AMR 602B, by manufacturer-B, may be best for light loads). The automation server 606 may receive instructions from the wareflow management server 608 of the internal corporate systems 622, and may use the received instructions to generate motor control commands for the AMRs 602A, 602B, and 602C. The fleet manager 604A, 604B, or 604C may be implemented in software running on any computing machine (e.g., computing machine 100, which may be a laptop computer, a desktop computer, a mobile phone, a tablet computer, a server, and the like). Alternatively, the fleet manager 604A, 604B, or 604C may be a standalone hardware device or a component in a specialized hardware device.

Each AMR 602A, 602B, and 602C has attached sensor device(s) 601A, 601B, and 601C that communicate with the automation server 606 (PLC via OPC/US, video via RTP/RTSP stream as an example). In addition, each AMR 602A, 602B, and 602C may include onboard sensors (made by the manufacturer of the AMR 602A, 602B, and 602C) that communicate with the associated fleet manager 604A, 604B, and 604C. Direct communication between the sensor devices 601A, 601B, and 601C and the automation server 606 improves processing speed and allows the automation server 606 to access sensor data that it would otherwise be unable to access because fleet managers 604A, 604B, and 604C may block access to the sensor data that they receive from the AMRs 602A, 602B, and 602C.

The automation server 606 may receive sensor data not only from the sensor devices 601A, 601B, and 601C attached to the AMRs 602A, 602B, and 602C, but also from other remote sensors 618 in the factory, high-resolution video cameras 616, and stationary PLC driven automation controller(s) 620. The automation controller(s) 620 may include controllers for conveyors, process equipment, facilities, lighting devices, heating, ventilation, and air conditioning (HVAC) devices, and security systems (e.g., fire doors). Advantageously, the automation server 606 may be used to control multiple AMRs 602A, 602B, and 602C from multiple different vendors and multiple automation controllers in the factory, rather than having different devices controlled using different machines.

The sensor devices 601A, 601B, and 601C attached to the AMRs 602A, 602B, and 602C, and the remote sensors 618 may include, for example, one or more of the following: mapping sensors, environmental sensors, accelerometers, video cameras, and security and safety sensors. Mapping sensors may be integrated onto the AMR and may use two-dimensional (2D) or three-dimensional (3D) lidar. The mapping sensors may communicate with the automation server 606 over the network. Lidar may use a predefined data format. Environmental sensors may include temperature, humidity or pressure sensors. Accelerometers may provide multiple axis (e.g., six axis) acceleration data to the automation server 606.

Video data may be processed from cameras (e.g., high-resolution cameras) that are attached to one of the AMRs or fixed. The automation server 606 may receive (e.g., over the network) video data from multiple video cameras and may integrate the video data to determine position(s) and movement(s) of object(s) in the factory. The video cameras may include human-visible spectrum cameras, infrared cameras, ultraviolet cameras, low-light cameras, thermal cameras, and the like. The video data may be combined at the automation server 606 and used, via artificial intelligence techniques, to make motion control decisions for the AMRs 602A, 602B, and 602C.

In some embodiments software and/or hardware video encoders may be used at the automation server 606. Software encoders may lack the high speed and low latency of hardware encoders. In addition, a private 5G network may offer higher video processing speed and lower video processing latency than a private Wi-Fi 4 network.

Some embodiments resolve vendor interoperability issues of AMRs 602A, 602B, and 602C by bypassing the fleet managers 604A, 604B, and 604C. The fleet managers 604A, 604B, and 604C are used to forward motion control commands from the automation server 606 to the AMRs 602A, 602B, and 602C.

Figure 7:
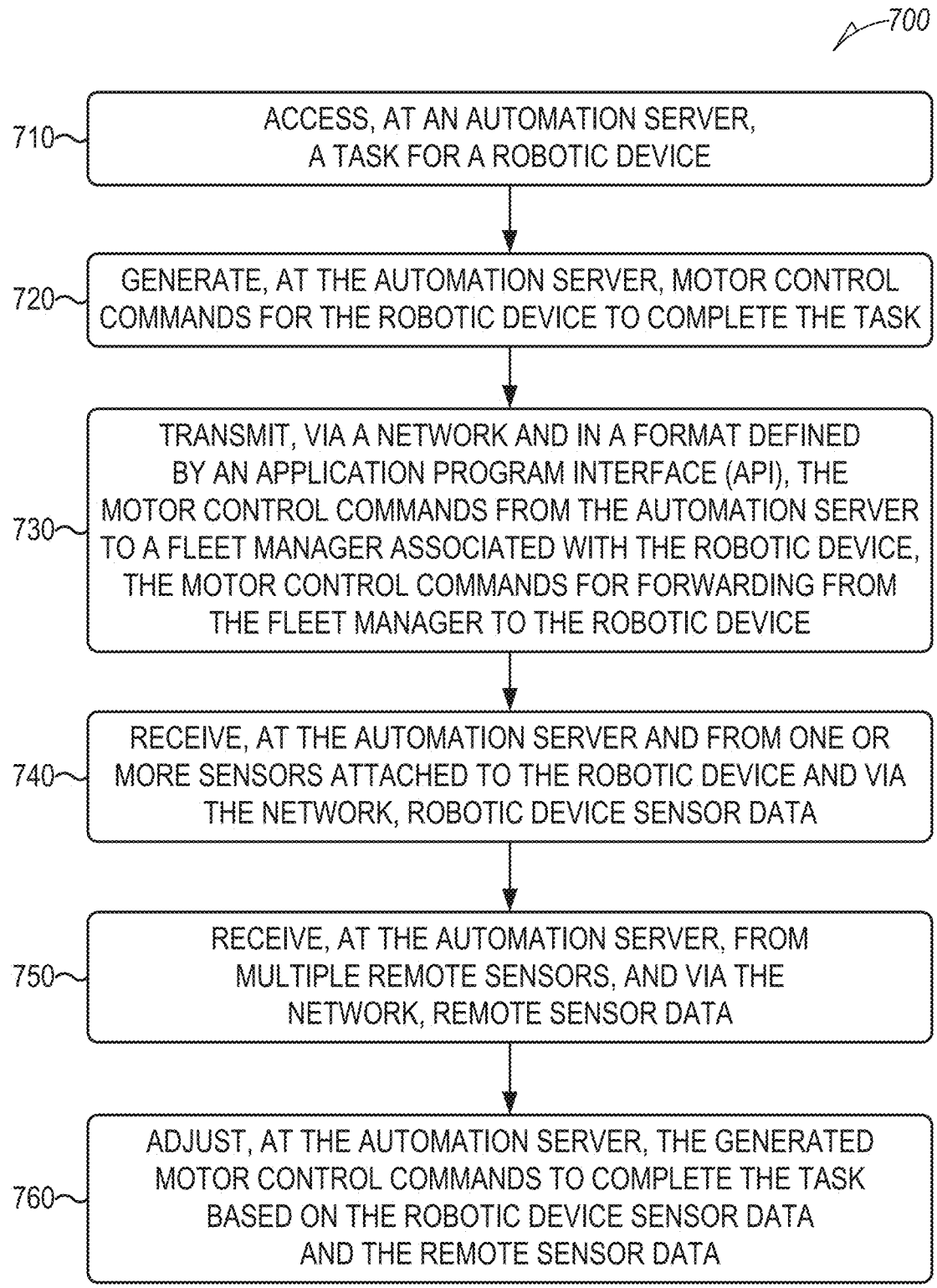
FIG. 7 is a flow chart of a method for integrated manufacturing automation, in accordance with some embodiments.

FIG. 7 is a flowchart of an example process 700 associated with integrated manufacturing automation. In some implementations, one or more process blocks of FIG. 7 may be performed by an automation server (e.g., automation server 506 or automation server 606). In some implementations, one or more process blocks of FIG. 7 may be performed by another device or a group of devices separate from or including the automation server. Additionally, or alternatively, one or more process blocks of FIG. 7 may be performed by one or more components of the computing machine 100, such as the processor 102, the main memory 104, the static memory 106, the drive unit 116, and the network interface device 120.

As shown in FIG. 7, process 700 may include accessing, at an automation server, a task for a robotic device (block 710). For example, the automation server may access a task for a robotic device, as described above. The task may be inputted by a human via a human machine interface (HMI) or graphical user interface (GUI), which may be connected to the automation server over the network.

In some embodiments, the automation server selects the most efficient robot/AMR to complete the task based on user defined criteria such as robot capability, location, batter level, and the like, and generates motor control commands for the robotic device to complete the task. For example, the automation server may generate motor control commands for the robotic device to complete the task, as described above.

As further shown in FIG. 7, process 700 may include generating, at the automation server, motor control commands for the robotic device to complete the task (block 720). For example, the automation server may generate motor control commands for the robotic device to complete the task, as described above.

As further shown in FIG. 7, process 700 may include transmitting, via a network and in a format defined by an Application Program Interface (API), the motor control commands from the automation server to a fleet manager associated with the robotic device, the motor control commands for forwarding from the fleet manager to the robotic device (block 730). For example, the automation server may transmit, via a network and in a format defined by an Application Program Interface (API), the motor control commands from the automation server to a fleet manager associated with the robotic device, the motor control commands for forwarding from the fleet manager to the robotic device, as described above. The fleet manager may be a vendor specific fleet management system.

As further shown in FIG. 7, process 700 may include receiving, at the automation server and from one or more sensors attached to the robotic device and via the network, robotic device sensor data (block 740). For example, the automation server may receive, from one or more sensors attached to the robotic device and via the network, robotic device sensor data, as described above. The one or more sensors attached to the robotic device may be communicatively coupled with the automation server. The one or more sensors attached to the robotic device might not communicate with or transmit data to the fleet manager or a computer on the robotic device. The sensor(s) may include vision device(s), such as camera(s).

As further shown in FIG. 7, process 700 may include receiving, at the automation server, from multiple remote sensors, and via the network, remote sensor data (block 750). For example, the automation server may receive, from multiple remote sensors and via the network, remote sensor data, as described above.

As further shown in FIG. 7, process 700 may include adjusting, at the automation server, the generated motor control commands to complete the task based on the robotic device sensor data and the remote sensor data (block 760). For example, the automation server may adjust the generated motor control commands to complete the task based on the robotic device sensor data and the remote sensor data, as described above.

Process 700 may include additional implementations, such as any single implementation or any combination of implementations described below and/or in connection with one or more other processes described elsewhere herein.

In a first implementation, the robotic device comprises one or more of an Autonomous Mobile Robot (AMR), an Automated Guided Vehicle (AGV), a PLC-operated device such as a robot arm. For example, the robotic device may be one or more of the AMRs 502A, 502B, 602A, 602B, and 602C. A robot arm may include multiple motors, one for each degree of freedom. PLC commands may be used to drive the robot arm to cause it to grab an object in response to a user input to grab the object.

In a second implementation, the fleet manager comprises software residing on a computing device (e.g., a laptop or desktop computer) distinct from the automation server. Alternatively, the fleet manager may comprise a virtual machine residing on a same physical machine as the automation server.

In a third implementation, the one or more sensors attached to the robotic device comprise one or more of a RGB (red green blue) camera, an infrared camera, an accelerometer, an ultrasonic sensor, an infrared sensor, a LIDAR sensor, a light sensor, a force sensor, a microphone, a thermometer, and a pressure sensor.

In a fourth implementation, the multiple remote sensors comprise one or more of an accelerometer, an ultrasonic sensor, an infrared sensor, a LIDAR sensor, a light sensor, a force sensor, a microphone, a thermometer, and a pressure sensor.

In a fifth implementation, process 700 includes generating, at the automation server, Programmable Logic Controller (PLC) commands to complete the task, the PLC commands being for a PLC-operated device and in a PLC format, transmitting, via the network, from the automation server directly to the PLC-operated device, the PLC commands.

In a sixth implementation, the PLC-operated device is physically attached to the robotic device. For example, the PLC-operated device may be a robot arm of the robotic device.

In a seventh implementation, the network comprises an onsite private wireless network. The private wireless network may be capable of demonstrating bandwidth of at least 100 MB/s and providing a latency of less than 100 milliseconds. The private wireless network may be capable of demonstrating bandwidth of at least 1 GB/s and providing a latency of less than 20 milliseconds. The private wireless may be capable of demonstrating bandwidth of at least 10 GB/s and providing a latency of less than 10 milliseconds. The network may include a server (e.g., the automation server) with multiple central processing units (CPUs) and multiple graphical processing units (GPUs). For example, the server may contain at least 32 virtual central processing units (vCPU) and one graphical processing unit. The server may contain at least 48 virtual central processing units (vCPUs) and 4 GPUs. The server may contain at least 96 vCPUs and 8 GPUs. The network may include an open platform communications (OPC) server for direct communication with PLCs.

In an eighth implementation, the one or more sensors attached to the robotic device do not transmit data to the fleet manager or to a computer on the robotic device.

In a ninth implementation, process 700 includes accessing, at the automation server, a second task for a second robotic device, generating, at the automation server, second motor control commands for the second robotic device based on the second task, and transmitting, via the network and in a second format defined by a second API, the second motor control commands from the automation server to a second fleet manager associated with the second robotic device, the second motor control commands for forwarding from the second fleet manager to the second robotic device.

In a tenth implementation, the second fleet manager associated with the second robotic device is different from the fleet manager associated with the robotic device.

In an eleventh implementation, process 700 includes prior to transmitting the motor control commands from the automation server to the fleet manager translating, at the automation server, the generated motor control commands for the robotic device into the format defined by the API.

In a twelfth implementation, process 700 includes generating, at the automation server, second motor control commands for a second robotic device, wherein the second robotic device is different from the robotic device. The process 700 may also include translating, at the automation server, the generated motor control commands for the second robotic device into a second format defined by a second API associated with a second fleet manager, wherein the second API is different from the API, and wherein the second fleet manager is different from the fleet manager. The process 700 may also include transmitting, via the network and in the second format defined by the second API, the second motor control commands from the automation server to the second fleet manager associated with the second robotic device, the second motor control commands for forwarding from the second fleet manager to the second robotic device.

In some embodiments, robotic devices from multiple vendors may be coordinated by the automation server to complete at ask. The techniques disclosed herein may be used in a manner enabling access to sensor devices (e.g., vision devices) located on a robotic device without requiring access to the robotic device controls or the fleet manager. The techniques disclosed herein may be used in a manner as to coordinate a multi-vendor AMR/PLC fleet of devices without requiring access to fleet management systems for anything beyond as an intermediary for motion control commands. The techniques disclosed herein may be used in a manner as to aggregate through direct transmission of data with a latency no greater than 100 ms to the automation server, manufacturing data from all sensors and vision sources to one location on the automation server.

Some embodiments may leverage machine learning. For example, some embodiments use machine learning algorithms for inference model training, process monitoring, process characterization, and predictive analysis. Some embodiments use machine learning algorithms to predict equipment failure. Some embodiments may leverage artificial intelligence driven activity, for example, deep learning algorithms may be invoked for real time processing on a local high-end server, such as the automation server 606.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Some embodiments are described as numbered examples (Example 1, 2, 3, etc.). These are provided as examples only and do not limit the technology disclosed herein.

Example 1 is a method comprising: accessing, at an automation server, a task for a robotic device; generating, at the automation server, motor control commands for the robotic device to complete the task; transmitting, via a network and in a format defined by an Application Program Interface (API), the motor control commands from the automation server to a fleet manager associated with the robotic device, the motor control commands for forwarding from the fleet manager to the robotic device; receiving, at the automation server and from one or more sensors attached to the robotic device and via the network, robotic device sensor data; receiving, at the automation server, from multiple remote sensors, and via the network, remote sensor data; adjusting, at the automation server, the generated motor control commands to complete the task based on the robotic device sensor data and the remote sensor data.

In Example 2, the subject matter of Example 1 includes, wherein the robotic device comprises one or more of the following: an Autonomous Mobile Robot (AMR), an Automated Guided Vehicle (AGV), a PLC-operated device, or a robot arm.

In Example 3, the subject matter of Examples 1-2 includes, wherein the fleet manager comprises software residing on a computing device distinct from the automation server.

In Example 4, the subject matter of Examples 1-3 includes, wherein the fleet manager comprises a virtual machine residing on a same physical machine as the automation server In Example 5, the subject matter of Examples 1-4 includes, wherein the one or more sensors attached to the robotic device comprise one or more of the following: a RGB (red green blue) camera, an infrared camera, an accelerometer, an ultrasonic sensor, an infrared sensor, a LIDAR sensor, a light sensor, a force sensor, a microphone, a thermometer, or a pressure sensor.

In Example 6, the subject matter of Examples 1-5 includes, wherein the multiple remote sensors comprise one or more of the following: an accelerometer, an ultrasonic sensor, an infrared sensor, a LIDAR sensor, a light sensor, a force sensor, a microphone, a thermometer, and a pressure sensor.

In Example 7, the subject matter of Examples 1-6 includes, generating, at the automation server, Programmable Logic Controller (PLC) commands to complete the task, the PLC commands being for a PLC-operated device and in a PLC format; transmitting, via the network, from the automation server directly to the PLC-operated device, the PLC commands.

In Example 8, the subject matter of Example 7 includes, wherein the PLC-operated device is physically attached to the robotic device.

In Example 9, the subject matter of Examples 1-8 includes, wherein the network comprises an onsite private wireless network.

In Example 10, the subject matter of Examples 1-9 includes, wherein the one or more sensors attached to the robotic device do not transmit data to the fleet manager or to a computer on the robotic device.

In Example 11, the subject matter of Examples 1-10 includes, accessing, at the automation server, a second task for a second robotic device; generating, at the automation server, second motor control commands for the second robotic device based on the second task; and transmitting, via the network and in a second format defined by a second API, the second motor control commands from the automation server to a second fleet manager associated with the second robotic device, the second motor control commands for forwarding from the second fleet manager to the second robotic device.

In Example 12, the subject matter of Example 11 includes, wherein the second fleet manager associated with the second robotic device is different from the fleet manager associated with the robotic device.

In Example 13, the subject matter of Examples 1-12 includes, prior to transmitting the motor control commands from the automation server to the fleet manager: translating, at the automation server, the generated motor control commands for the robotic device into the format defined by the API.

In Example 14, the subject matter of Example 13 includes, generating, at the automation server, second motor control commands for a second robotic device, wherein the second robotic device is different from the robotic device; translating, at the automation server, the generated motor control commands for the second robotic device into a second format defined by a second API associated with a second fleet manager, wherein the second API is different from the API, and wherein the second fleet manager is different from the fleet manager; transmitting, via the network and in the second format defined by the second API, the second motor control commands from the automation server to the second fleet manager associated with the second robotic device, the second motor control commands for forwarding from the second fleet manager to the second robotic device.

In Example 15, the subject matter of Examples 1-14 includes, selecting, at the automation server, the robotic device to complete the task, wherein the robotic device is selected from among multiple robotic devices having different vendors and different capabilities, wherein the robotic device is selected based on user-defined criteria including one or more of capability, location, and battery life.

In Example 16, the subject matter of Example 15 includes, wherein the automation server leverages a deep learning artificial neural network for one or more of the following: generating the motor control commands, adjusting the generated motor control commands, and selecting the robotic device.

Example 17 is at least one machine-readable medium including instructions that, when executed by processing circuitry, cause the processing circuitry to perform operations to implement of any of Examples 1-16.

Example 18 is an apparatus comprising means to implement of any of Examples 1-16.

Example 19 is a system to implement of any of Examples 1-16.

Example 20 is a method to implement of any of Examples 1-16.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of managing and controlling a plurality of robotic devices from different manufacturers, wherein each of the manufacturers has a different fleet manager to control the robotic devices that are associated with that manufacturer, and further wherein the different fleet managers are not compatible with each other, the method comprising:
   accessing, at an automation server, a first task for a first robotic device of the plurality of robotic devices;
   selecting, at the automation server, which robotic device of the plurality of robotic devices from different manufacturers is best suited to complete the first task and thereby be the first robotic device;
   generating, at the automation server, first motor control commands for the selected first robotic device to complete the first task;

transmitting, via a network and in a format defined by a first Application Program Interface (API), the first motor control commands from the automation server to the fleet manager associated with the selected first robotic device, the first motor control commands for forwarding from the fleet manager to the selected first robotic device;

accessing, at the automation server, a second task for a second robotic device;

selecting, at the automation server, which robotic device of the plurality of robotic devices from different manufacturers is best suited to complete the second task and thereby be the second robotic device, wherein the selected second robotic device is a robotic device from a different manufacturer than the selected first robotic device;

generating, at the automation server, second motor control commands for the selected second robotic device based on the second task; and transmitting, via the network and in a second format defined by a second API, the second motor control commands from the automation server to the fleet manager associated with the second robotic device, the second motor control commands for forwarding from the second fleet manager to the second robotic device;

receiving, at the automation server and from one or more sensors attached to the selected first robotic device and the selected second robotic device and via the network, robotic device sensor data, wherein the robot device sensor data from the selected first robotic device and the selected second robotic device is received by the automation server simultaneously and without being communicated through the fleet manager that is associated with the selected first robotic device or the selected second robotic device;

receiving, at the automation server, from multiple remote sensors, and via the network, remote sensor data, wherein the remote sensor data is received at the automation server simultaneously with the robot device sensor data;

adjusting, at the automation server, the generated motor control commands to complete the first task or the second task based on the robotic device sensor data and the remote sensor data.

2. The method of claim 1, wherein each robotic device of the plurality of robotic devices comprises one or more of the following: an Autonomous Mobile Robot (AMR), an Automated Guided Vehicle (AGV), or a PLC-operated device.

3. The method of claim 1, wherein each fleet manager for the different manufacturers of the plurality of robotic devices comprises software residing on a computing device distinct from the automation server.

4. The method of claim 1, wherein each fleet manager for the different manufacturers of the plurality of robotic devices comprises a virtual machine residing on a same physical machine as the automation server.

5. The method of claim 1, wherein the one or more sensors attached to the selected first robotic device and the selected second robotic device comprise one or more of the following: a RGB (red green blue) camera, an infrared camera, an accelerometer, an ultrasonic sensor, an infrared sensor, a LIDAR sensor, a light sensor, a force sensor, a microphone, a thermometer, or a pressure sensor.

6. The method of claim 1, wherein the multiple remote sensors comprise one or more of the following: an accelerometer, an ultrasonic sensor, an infrared sensor, a LIDAR sensor, a light sensor, a force sensor, a microphone, a thermometer, or a pressure sensor.

7. The method of claim 1, further comprising:
generating, at the automation server, Programmable Logic Controller (PLC) commands to complete the first task, the PLC commands being for a PLC-operated device and in a PLC format;
transmitting, via the network, from the automation server directly to the PLC-operated device, the PLC commands.

8. The method of claim 7, wherein the PLC-operated device is physically attached to the selected first robotic device.

9. The method of claim 1, wherein the network comprises an onsite private wireless network.

10. The method of claim 1, wherein the one or more sensors attached to the selected first robotic device and the selected second robotic device do not transmit data to the fleet manager for the selected first robotic device or the selected second robotic device or to a computer on the selected first robotic device or the selected second robotic device.

11. The method of claim 1, further comprising:
prior to transmitting the motor control commands from the automation server to the fleet manager associated with the selected first robotic device: translating, at the automation server, the generated first motor control commands for the selected first robotic device into the format defined by the first API.

12. The method of claim 1, wherein the step of selecting which robotic device of the plurality of robotic devices from different manufacturers is best suited to complete the first task further comprises:
selecting the first robotic device based on user-defined criteria including one or more of capability, location, and battery life.

13. The method of claim 12, wherein the automation server leverages a deep learning artificial neural network for one or more of the following: generating the first or second motor control commands, adjusting the generated first or second motor control commands, and selecting the first or second robotic device.

14. A method of managing and controlling a plurality of robotic devices from different manufacturers, wherein each of the manufacturers has a different fleet manager to control the robotic devices that are associated with that manufacturer, and further wherein the different fleet managers are not compatible with each other, the method comprising:
accessing, at an automation server, a first task for a first robotic device of the plurality of robotic devices;
selecting, at the automation server, which robotic device of the plurality of robotic devices from different manufacturers is best suited to complete the first task and thereby be the first robotic device;
generating, at the automation server, first motor control commands for the selected first robotic device to complete the first task;
transmitting, via a network and in a format defined by a first Application Program Interface (API), the first motor control commands from the automation server to the fleet manager associated with the selected first robotic device, the first motor control commands for forwarding from the fleet manager to the selected first robotic device;
accessing, at the automation server, a different task for a robotic device;

selecting, at the automation server, which robotic device of the plurality of robotic devices from different manufacturers is best suited to complete the different task, wherein the robotic device selected for the different task is different than the first robotic device and thereby a different selected robotic device;

generating, at the automation server, second motor control commands for the different selected robotic device based on the different task; and transmitting, via the network, the second motor control commands from the automation server to the fleet manager associated with the different selected robotic device, the second motor control commands for forwarding from the fleet manager to the different selected robotic device;

receiving, at the automation server and from one or more sensors attached to the selected first robotic device and the different selected robotic device and via the network, robotic device sensor data, wherein the robot device sensor data from the selected first robotic device and the different selected robotic device is received by the automation server simultaneously and without being communicated through the fleet manager that is associated with the selected first robotic device or the different selected robotic device;

receiving, at the automation server, from multiple remote sensors, and via the network, remote sensor data, wherein the remote sensor data is received at the automation server simultaneously with the robot device sensor data;

adjusting, at the automation server, the generated motor control commands to complete the first task or the different task based on the robotic device sensor data and the remote sensor data.

* * * * *